United States Patent Office 2,726,244
Patented Dec. 6, 1955

2,726,244

WATER-SOLUBLE MONO-BETAINE HYDRAZONES OF THE AMINOCHROMES AND PROCESS OF PREPARING SAME

Harry H. Sobotka, New York, N. Y., assignor to Mount Sinai Hospital Research Foundation, Inc., New York, N. Y., a corporation of New York No Drawing. Application July 7, 1953, Serial No. 366,633

8 Claims. (Cl. 260—295)

This invention relates to water-soluble derivatives of aminochromes and to a process of preparing the same.

The term "aminochromes" as used herein is intended to designate certain oxidation products of α-dihydroxyphenyl-β-alkylamino-alkanes, and more particularly the orthoquinones of the dihydroindoles. Oxidation of these compounds by bromine, iodates, silver oxide and also by specific oxidases of the tyrosinase type, leads to the formation of dark-red or purple oxidation products which have been formulated as orthoquinones of dihydroindoles, the carbonyl groups being presumably in the 5 and 6 positions:

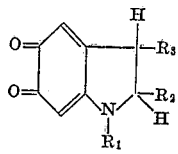

wherein $R_1$ may be an alkyl group such as methyl, ethyl or isopropyl; $R_2$ may be H or the methyl group; and $R_3$ may be H or OH. An alternative structure as paraquinoid betaine or "zwitterion" has also been proposed:

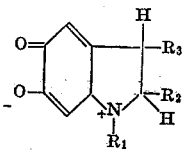

When using bromine or iodate as the oxidizing agent, halogen substitution also occurs on carbon atom 2 in the heterocyclic ring. The earliest known representative of the aminochromes has been designated adrenochrome and is obtainable from adrenalin; similarly, the corresponding cyclized oxidation product of epinine may be designated as "epinochrome," of aludrine as "aludrinochrome," etc.

Several pharmacological effects have been observed with, or ascribed to adrenochrome and its analogs. It has been found that the injection of 10–20 mg. halogenoadrenochrome, repeated once or twice, into experimentally hypertensive animals exerts a strong and protracted "antipressor" effect, i. e., it produces a lowering of the arterial blood pressure to normal levels for a period of several weeks. Amounts of 1.0 mg. and less have been shown to shorten the bleeding time in experimental animals and man, an effect designated as "hemostatic."

However, aminochromes are in general only slightly soluble in water, physiological saline and other aqueous solutions. Moreover, such dilute aqueous solutions are very unstable and betray the decomposition of the active component by discoloration and melanization at room temperature within a few minutes after preparation of the solution. On the other hand, their solution or suspension in fatty oils or propylene glycol is unsuitable for therapeutic usage.

Adrenochrome derivatives having increased stability have been prepared by reacting adrenochrome with various nitrogenous "keto"-agents, such as hydroxylamine, semicarbazide and substituted hydrazines (Belgium Patent No. 453,374). However, the resulting oximes, semicarbazones and hydrazones are but slightly soluble in water at normal body temperature, their solubility not exceeding 0.05 percent or one part in 2000.

I have prepared highly water-soluble derivatives of the aminochromes which are stable and injectible in neutral sterile aqueous solution. More particularly, I have found that the aminochromes form extremely water-soluble and stable compounds with hydrazides of acetic acid carrying a quaternary nitrogen atom such as acethydrazide pyridinium chloride. These hydrazides may be properly referred to as betaine hydrazides. The resulting condensation products (betaine hydrazones) dissolve in water, physiological saline or phosphate buffer solutions in an amount up to 20 percent. These solutions, adjusted to pH 6–7.5, and after passage through a sterile filter show no decomposition or discoloration after standing for six months at 4° C. They have been injected intravenously and intramuscularly in quantities up to 500 mg. into dogs without any toxic effects except for symptoms due to their acute effect on the blood pressure.

Betaine hydrazides of the type used in preparing the betaine hydrazones of the present invention have been used as a chemical tool in the isolation of ketonic hormone compounds with which they form transient, easily dissociated intermediates (Girard and Sandulesco, U. S. Patent No. 2,045,132), but so far as I am aware have never heretofore been used in forming water-soluble condensation products sufficiently stable to warrant consideration for pharmaceutical purposes.

The synthesis of the new compounds of the present invention is described in the following example:

EXAMPLE

*Acethydrazone pyridinium chloride of DL-adrenochrome*

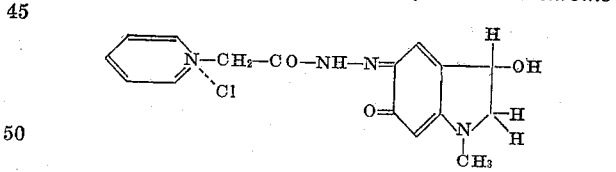

3.6 g. (0.02 mol.) of DL-adrenochrome which had been prepared from DL-epinephrine were dissolved in 100 cc. absolute methanol containing 1% glacial acetic acid, 4.2 g. (0.022 mol.) acethydrazide pyridinium chloride were added and the solution refluxed for 15 minutes. To the cooled solution was added 300 cc. ice cold absolute ether. The condensation product which crystallized on standing was redissolved in 200 cc. dry methanol and purified by shaking with or chromatographing on aluminum oxide of slightly acid reaction. The supernatant liquid or eluate, when concentrated in vacuo under nitrogen, yielded the acethydrazone pyridinium chloride of DL-adrenochrome. The color of the condensation product and its solution is chestnut color and the purified crystalline condensation product melted with decomposition at a temperature below 210° C. and exhibited, on elementary analysis the composition demanded by the formula $C_{16}H_{23}O_3N_4Cl$.

Other water-soluble mono-betaine hydrazones of the aminochromes which are prepared in accordance with this invention include acethydrazone pyridinium chloride of epinochrome having the structural formula

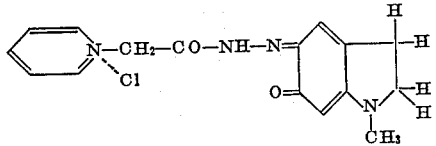

as well as acethydrazone pyridinium chloride of DL-aludrinochrome having the structural formula

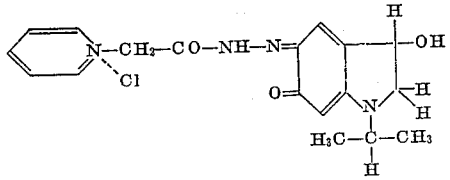

It will be understood that the specific aminochromes mentioned above are cited by way of example only and that the process of this invention may be carried out with the use of any of the orthoquinones of the dihydroindoles having the structural formula

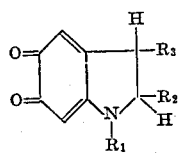

wherein $R_1$ may be an alkyl group such as methyl, ethyl, or isopropyl; $R_2$ may be H or the methyl group and $R_3$ may be H or OH. Other of the known orthoquinones of dihydroindoles are the aminochrome derivatives of ethyl "adrenaline" and N-methyl-cobrefrine. The aminochrome may be either the dextro, the laevo or the optically inactive racemic form. Likewise, the hydrazide may be an acethydrazide conforming to the formula

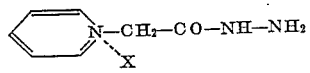

wherein X is a monovalent anion such as $Cl^-$, $Br^-$, $HSO_4^-$ or $OH^-$.

In its broader aspects, the invention may be defined as including any of the aminochrome derivatives defined by the formula

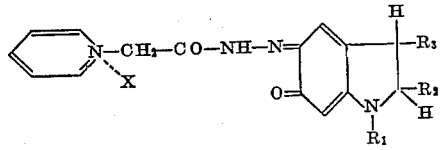

wherein $R_1$, $R_2$, $R_3$, and X have the meanings set forth hereinabove.

This application is a continuation-in-part of my co-pending application Serial No. 122,357, filed October 19, 1949, now Patent No. 2,655,510.

I claim:
1. The process of preparing water soluble pyridinium mono-betaine hydrazones of aminochromes conforming to the formula

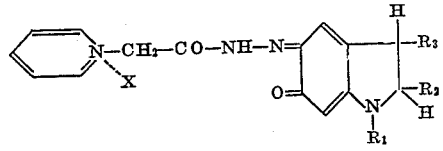

wherein $R_1$ is selected from the group consisting of methyl, ethyl, and isopropyl radicals, $R_2$ is selected from the group consisting of hydrogen and the methyl radical, $R_3$ is selected from the group consisting of hydrogen and the hydroxy radical and X is a monovalent anion which comprises reacting an orthoquinone of a dihydroindole having the formula

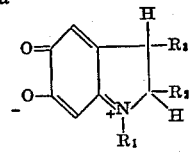

with an acethydrazide having the formula

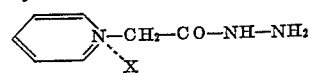

the symbols $R_1$, $R_2$, $R_3$ and X used in defining the formulas for the orthoquinone and the acethydrazide having the same meaning as set forth in defining the reaction product.

2. A process of preparing acethydrazone pyridinium chloride of adrenochrome conforming to the formula

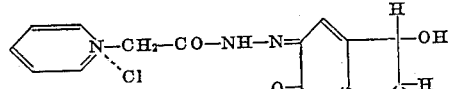

which comprises reacting adrenochrome having the formula

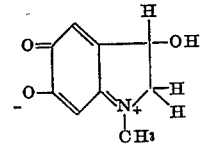

with acethydrazide pyridinium chloride.

3. A process of preparing acethydrazone pyridinium chloride of epinochrome having the structural formula

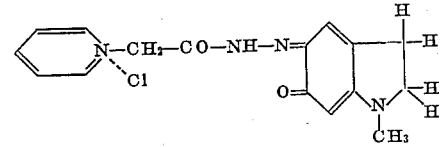

which comprises reacting epinochrome having the formula

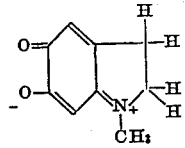

with acethydrazide pyridinium chloride.

4. A process of preparing acethydrazone pyridinium chloride of aludrinochrome having the structural formula

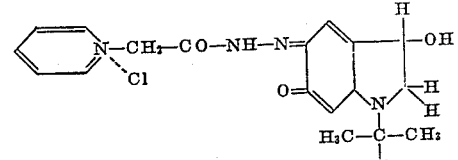

which comprises reacting aludrinochrome having the formula

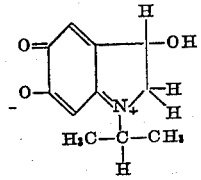

with acethydrazide pyridinium chloride.

5. A water-soluble aminochrome derivative having the structural formula

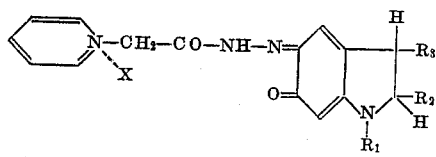

wherein $R_1$ is selected from the group consisting of the methyl, ethyl and isopropyl radicals, $R_2$ is selected from the group consisting of hydrogen and the methyl radical, $R_3$ is selected from the group consisting of hydrogen and the hydroxy radical and X is a monovalent anion.

6. The acethydrazone pyridinium chloride of adrenochrome having the structural formula

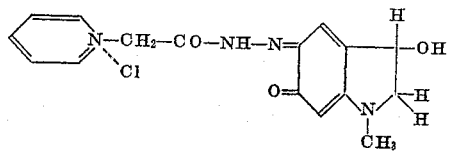

7. The acethydrazone pyridinium chloride of epinochrome having the structural formula

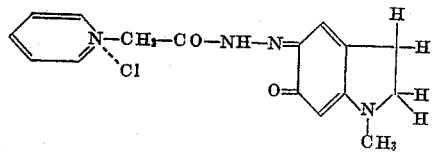

8. The acethydrazone pyridinium chloride of aludrinochrome having the structural formula

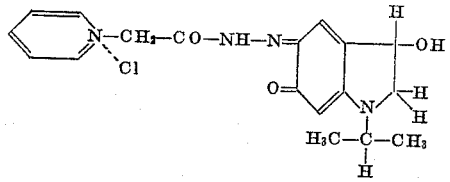

References Cited in the file of this patent
UNITED STATES PATENTS 2,655,510   Sobotka ---------------- Oct. 13, 1953